United States Patent [19]

Mamon

[11] Patent Number: 5,323,950
[45] Date of Patent: Jun. 28, 1994

[54] FLEXIBLE, ADJUSTABLE WELDING BACKUP MANDREL

[75] Inventor: Octavio L. Mamon, San Diego, Calif.

[73] Assignee: General Dynamics Corporation, Space Systems, San Diego, Calif.

[21] Appl. No.: 98,990

[22] Filed: Jul. 29, 1993

[51] Int. Cl.⁵ .................... B23K 5/22; B23K 37/04
[52] U.S. Cl. ............................ 228/50; 269/48.1; 219/160
[58] Field of Search ............... 228/50, 216; 269/48.1; 219/61.1, 160

[56] References Cited

U.S. PATENT DOCUMENTS

| | | | |
|---|---|---|---|
| 3,261,529 | 7/1966 | Pagan | 228/216 |
| 4,465,220 | 8/1984 | Ledlow et al. | 228/50 |
| 5,110,031 | 5/1992 | Rinaldi | 228/50 |

*Primary Examiner*—P. Austin Bradley
*Assistant Examiner*—Jeffrey T. Knapp
*Attorney, Agent, or Firm*—Frank D. Gilliam; John R. Duncan

[57] ABSTRACT

A backup mandrel apparatus to engage the inner surface of a metal tube being welded to support the weld bead and to keep a molten weld puddle from sagging and falling through the tube wall during welding. The apparatus includes a flexible inflatable bladder surrounded by a split expandable mandrel, an expandable band typically surrounding a central portion of the split expandable mandrel, insulation pads surrounding the mandrel adjacent to the expandable band and insulation material covering the inflatable bladder. The insulation pads preferably have a compressed thickness slightly greater than the band thickness. This assembly is inserted within the tubular workpiece to be welded. In use, the inflatable bladder is inflated with low air or water pressure to expand the mandrel to uniformly expand the expandable band to press the insulation pads against the inner side of the tubing workpiece being welded while leaving either no gap or a narrow gap between the band and the inner tube wall surface.

12 Claims, 2 Drawing Sheets

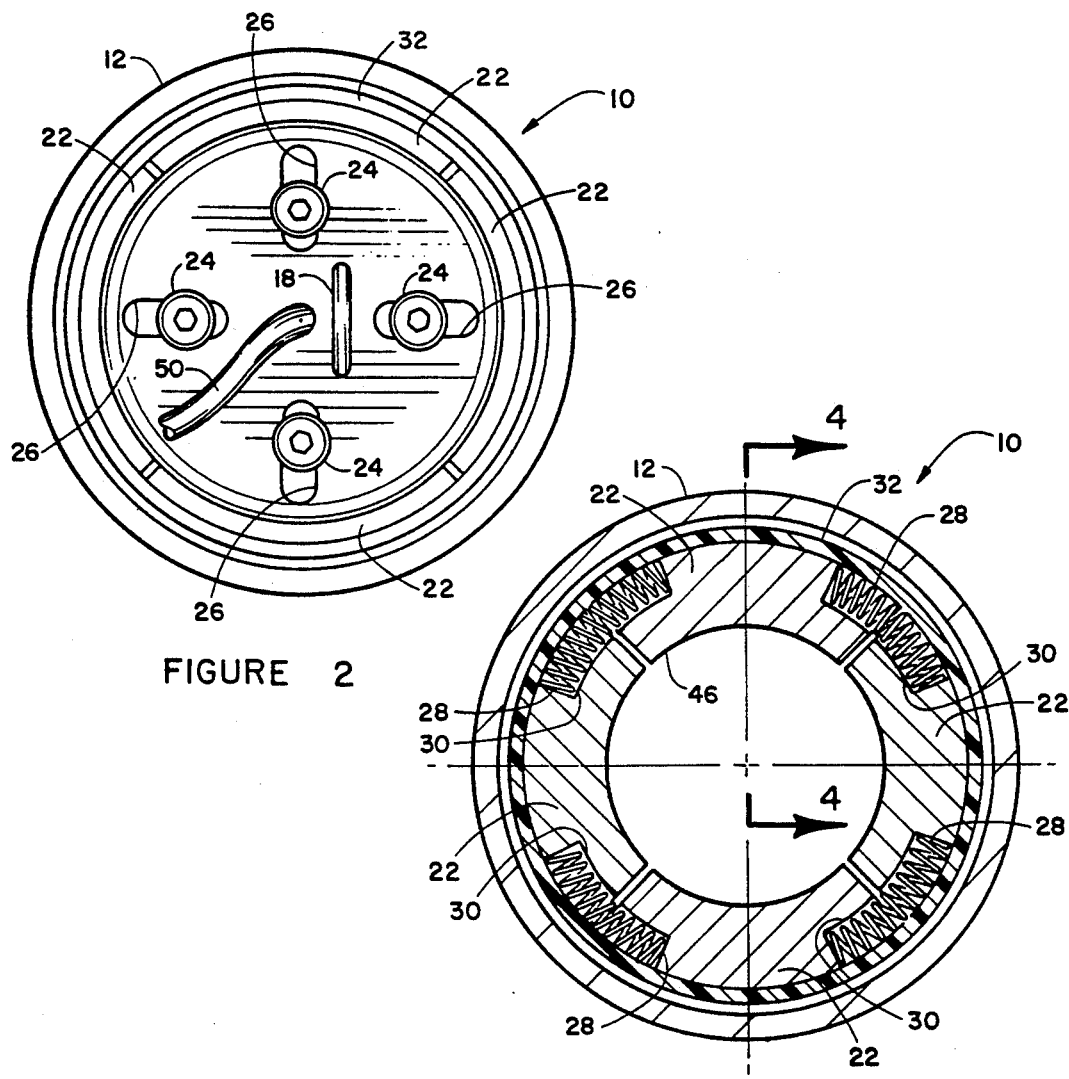

FLEXIBLE, ADJUSTABLE WELDING BACKUP MANDREL

BACKGROUND OF THE INVENTION

This invention relates in general to the welding of metal tubes or pipes and, more specifically, to an improved backup mandrel for use in such welding.

A fusion welding system is one current type of system used for butt welding metal structures which are in close fitting contact along a weld line or for repairing defects such as cracks in metal structures. In fusion welding, a welding head is placed on one side of the structure to be welded. Then the head is adapted to heat metal along the weld line to fusion temperature. A welding backup apparatus typically engages the side of the structure opposite to the welding head and is also aligned with the welding location. In addition, the apparatus used must resist significant degradation at the temperatures used to fuse the metal.

In butt welding thin sheets, tubes or other thin structures together, a number of problems may be encountered. Welding such structures without support along the weld line opposite the welding head is generally unsatisfactory. Molten metal from the weld zone tends to drop through, leaving voids along the weld line. Also, the underside of the weld tends to be uneven, with droplet-like projections. In an attempt to overcome some of the problems mentioned above, prior art has shown developments in use of backup devices in the form of tapes. One such example is in Roden et al. U.S. Pat. No. 4,049,183, which described a welding backup tape. Attempts have been made to support weld lines with tape-like support means of various kinds, adhesively bonded along the weld line. The surfaces of some backup tapes are intended to fuse during the welding operation, and may include a surface layer of a flux. This type tape is undesirable in high quality aerospace type applications where the weld must be free of contamination. Furthermore, tape-like supports are not usable on weld joints far removed from either end of a tube assembly. Other commercial tapes, while satisfactory for rough work or where the weld bead is to be finish machined, do not provide adequate support to produce highly uniform, smooth weld beads. In some cases, local failure of the tape from thermal weakening or melting will permit drop through of the fused metal, leaving insufficient metal to form a satisfactory bead, especially where no metal is added during welding.

In order to provide sufficient support, many tapes require a rigid backup plate pressing the tape against the weld underbead. In welding complex structures, such as along tubes, it is inconvenient to attempt to hold the tape in place with a solid member. Since the solid backing member must conform to the surface being welded, a special backing member must be built for each structure design being welded. Other backup tapes or strips may include a metal or solid refractory strip to provide rigid support. These tapes are complex, heavy, difficult to install and will only conform to curved weld surfaces of large radii of curvature.

Therefore, with the above noted problems, there is a continuing need for an improved welding backup apparatus for use in welding metals such as stainless steel or aluminum to high quality standards.

OBJECTS OF THE INVENTION

An object, therefore of this invention, is to provide a welding backup mandrel overcoming the above-noted problems.

Another object of this invention is to provide a backup mandrel allowing improved surface finish and ease of placement at weld joints in hard to reach areas.

Another object of this invention is to provide a backup mandrel which is adjustable and reusable.

Still another object of this invention is to provide a backup mandrel which minimizes the number of junctions that can disrupt the weld flow.

A further object of this invention is to provide a backup mandrel which eases compliance with general welding reinforcement practice and requirements.

SUMMARY OF THE INVENTION

The present invention is a welding backup mandrel. The purpose of the elements in the apparatus is to cooperate to provide a physical contact pressed against the inner circumference of a tubing workpiece structure being welded. In this way, the backup mandrel keeps molten weld puddles from sagging and falling through a tube workpiece structure being welded. The major components of the mandrel include an inflatable bladder, which is encased by a split expandable mandrel. The expandable mandrel is secured by end caps. A hose leading from an inflating source passes through one end cap and into the inflatable bladder. Ropes are connected to both end caps allowing the welding backup mandrel to be easily moved axially into and out of the tubing workpiece of variable dimensions. The ability to move the backup mandrel is a particular advantage in areas of difficult access. In addition, the construction of the backup mandrel is adaptable to tubing workpieces of various dimensions.

As the split expandable mandrel expands, it is tangentially pressed against the tubing workpiece inner diameter as the inflatable bladder is inflated through the hose from the inflating source. An expandable backup band encircles the expandable mandrel. The backup band is also affixed to the expandable mandrel. As the inflatable bladder expands under pressure, the expandable backup band is increased in diameter until it contacts, or nearly contacts, the inner diameter of the tubing workpiece. By having the backup band in close proximity, but not touching the area to be welded, a narrow air gap is created. The air gap allows the molten metal of the tubing workpiece to cast against the backup band. An advantage of the air gap is improved surface finish of the weld and easier compliance with general welding practice. Still another advantage to the backup band in the preferred embodiment is preventing molten metal from dropping through the workpiece, or from forming droplet-like projections from the workpiece.

The inflatable bladder is sufficiently expanded to provide a contaminant free air gap. The air gap is sealed off from contamination sources by the expandable mandrel pressing against the tubing workpiece. A contaminant-free welding junction is another important advantage of the preferred embodiment of the invention. The insulation material is at least slightly compressible to aid in sealing the mandrel to tube interface and to allow the backup band to selectively be brought either into contact with the tube inner wall of to a location slightly spaced from the wall.

While a single, centrally located backup band having two bands of insulation on the sides thereof, if desired, two or more spaced backup bands may be used if desired is regular, spaced areas along the tube are to be welded. Insulation material will be used on both sides of each backup band.

Depending on the type of welding required and the metals involved, an inert gas, such as argon, may be applied in the zone around the welding head in order to help prevent the molten metal of the tubing workpiece from oxidizing at the weld point.

These and other aspects of the present invention are set forth more completely in the following description and the accompanying drawings.

BRIEF DESCRIPTION OF THE DRAWINGS

FIG. 2 is an end elevation view of the backup mandrel in a tube, taken on line 2—2 in FIG. 1;

FIG. 3 is a transverse section view through the backup mandrel, taken on line 3—3 in FIG. 1;

FIG. 4 is a partial, detail, schematic axial section view of a portion of the backup mandrel, taken on line 4—4 in FIG. 2.

DETAILED DESCRIPTION OF THE PREFERRED EMBODIMENTS

Figure 1:
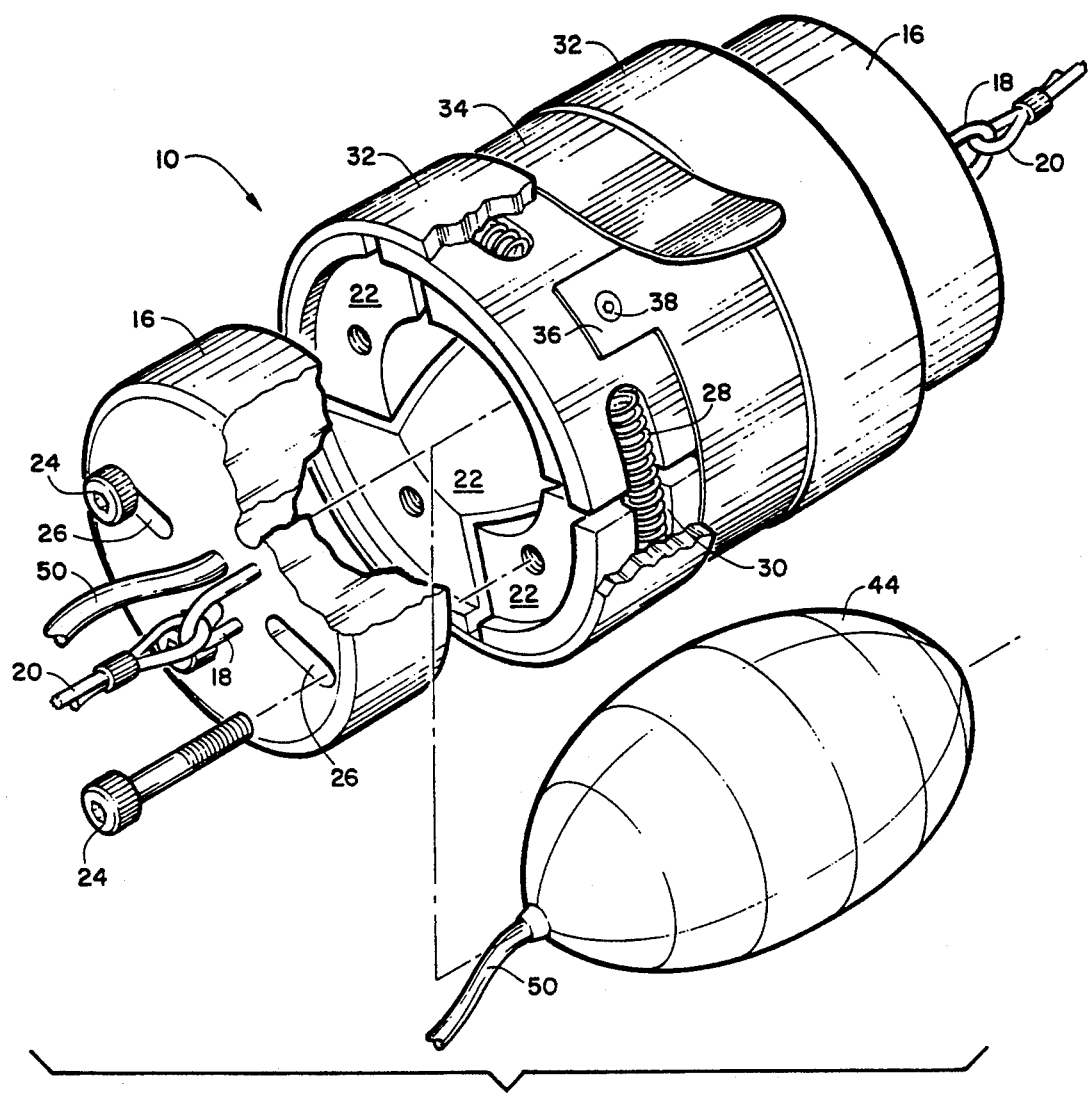
FIG. 1 is a side elevation of the backup mandrel within a tube, partially cut away to reveal internal components.

Referring now to FIGS. 1, 2 and 3, there is seen a side elevation view of the expandable backup mandrel 10 of this invention in place in a pipe 12 having an area or weld joint 14 to be welded. The near side of pipe 12 and certain other components, as indicated below, are partially cut away to reveal interior components.

The ends of mandrel 10 are covered by end caps 16. A ring or pad eye 18 is secured to each end cap 16, such as by welding. A rope 20 or the like extends from each pad eye 18 to the ends of pipe 12 to permit mandrel 10 to be pulled along the pipe in either direction to a selected position. If desired, other moving means, such as an elongated pole in the nature of a boat hook could be used.

An axially split expandable mandrel 22 extends between end caps 16. Split mandrel 22 basically has a cylindrical configuration divided along axial planes into a plurality of "pie" shaped segments. Split mandrel 22 has an internal cavity in the general shape of an oblate spheroid, to contain an inflatable bladder as discussed below. While the four segment arrangement shown is preferred for efficiency and simplicity, a greater number may be used, if desired.

A plurality of bolts 24, are threaded into the ends of the split mandrel segments through radial slots 26 in each end cap 16. Each segment is secured to one bolt 26 at each segment end. The segments of split mandrel 22 are free to move radially, while constrained against circumferential movement.

The segments are biased toward the center of the assembly by springs 28 installed in slots 30 machined in the split mandrel segments along the segment edges. The ends of springs 28 are secured to the ends of slots 30 by any suitable means, such as spot welds, small bolts, etc (not shown, for clarity).

Two flexible bands 32 of thermal insulation material are wrapped around the ends of split mandrel 22. Typically, woven or knit silica fiber insulating materials may be used. These materials stretch slightly when the segments of split mandrel 22 expand away from center and contract slightly when the split mandrel is moved toward the center by springs 28.

Figure 5:
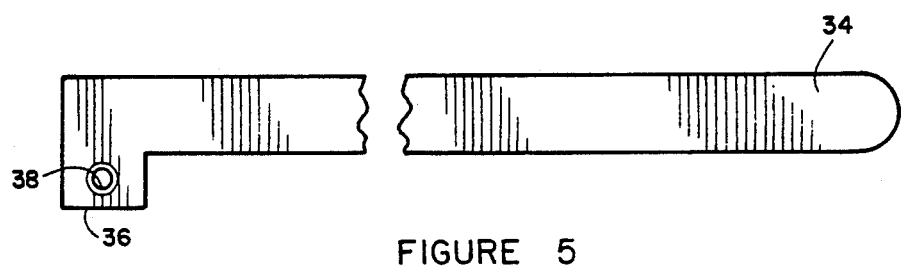
FIG. 5 is a plan view of an unrolled backup band used in the backup mandrel.

A backup band 34, typically formed from stainless steel or the like, having the configuration shown in FIG. 5, is wrapped around split mandrel 22 intermediate the two insulation bands 32. The band may be straight and formed from slightly springy material so as to press outwardly against the inner tube wall when the mandrel is installed in a tube. Alternatively, backup band 34 may be wound to a smaller diameter than that of the split mandrel 22, so that the spring forces tend to bias backup band 34 against the mandrel surface. This is preferable where a small gap is desired between the backup band and inner tube wall when the mandrel is fully expanded. An ear 36 extending transversely of band 34 includes a hole 38 for fastening band 34 to split mandrel 22 by a small bolt, angled pin or the like 40, preferably somewhat recessed into the surface of the band segment. Backup band 34 is typically manually wrapped tightly around split mandrel 22, then the assembly is inserted into pipe 12.

An inflatable bladder 42 is positioned in the central cavity in split mandrel 22. Preferably, cavity 44 extends slightly into end caps 16 to provide a smooth, generally oblate spheroidal, bladder configuration. Bladder 42 is covered with a uniform layer of flexible thermal insulation material 46 to protect the bladder material from heat during welding, schematically indicated by weld bead 48 in FIG. 4. Any suitable material may be used in bladder 42, such as high temperature resistant urethane materials. Typical insulation materials suitable for use as insulation layer 46 include woven silica fiber materials. A hose or tube 50 extends from bladder 42 through end cap 16 to a source of pressurized fluid (not shown) such as high pressure air, pressurized water, or the like.

In use, the expandable mandrel 10 is assembled, backup band 34 is wound around split mandrel 22 and the assembly is inserted into a pipe to be welded. Ropes 20 extending from each end are used to precisely position the assembly with backup band 34 aligned with the weld joint as schematically indicated at bead 48. Bladder 42 is then pressurized, forcing insulation bands 32 into tight, preferably air tight, engagement with the inner wall of pipe 12. It is generally desirable to prevent outside air from entering the weld area, so that an inert gas may be used both within and without the weld area during welding. As bladder 42 expands, backup band 34 slips along itself, expanding into pressure contact with the inner wall of pipe 12 at the weld area, so that the resulting weld will have a smooth interior surface. Once welding is complete, pressure in bladder 34 is released, allowing springs 28 to retract the segments of split mandrel 22. The assembly can then be removed or moved to another welding location.

The foregoing description of the invention is explanatory thereof and various changes in the size, shape and materials, as well as on the details of the illustrated construction may be made, within the scope of the appended claims without departing from the spirit of the invention.

What is claimed is:

1. A backup mandrel apparatus for engaging the inside wall of a tube during welding on the tube exterior which comprises:
   an inflatable bladder;

means for selectively inflating and deflating said bladder;

a generally tubular axially split expandable mandrel surrounding said bladder;

at least one backup band wrapped around said expandable mandrel, said backup band covering less than all of the expandable mandrel surface;

a layer of thermal insulation material wrapped around the areas of said expandable mandrel not covered by said backup band, said insulation layer having a thickness greater than the thickness of said backup band; and means for moving said apparatus longitudinally within a tube.

2. The apparatus according to claim 1 further including a layer of thermal insulating material covering said bladder.

3. The apparatus according to claim 1 wherein said split expandable mandrel is split axially along at least two spaced lines producing pie-shaped portions and further includes spring means biasing said portions together.

4. The apparatus according to claim 1 further including end caps adjacent to the ends of said expandable mandrel, each end cap having a plurality of radial slots therethrough, and a bolt extending in slidable relationship through each slot and secured to said expandable mandrel, whereby as said expandable mandrel expands and contracts said bolts slide in said slots while preventing rotation of said expandable mandrel relative to said end caps.

5. The apparatus according to claim 1 wherein said means for moving said mandrel includes eyes secured to ends of said mandrel and means secured to said eyes and extending away from said mandrel for pulling said mandrel along said tube in either direction.

6. The apparatus according to claim 1 wherein said means for inflating said bladder includes a hose extending from said bladder through an end cap and adapted to be connected to a source of pressurized fluid.

7. A backup mandrel apparatus for engaging the inside wall of a tube during welding on the tube exterior, which comprises:

an inflatable bladder;

means for inflating and deflating said bladder;

a generally tubular expandable mandrel axially split into a plurality of pie-shaped sections surrounding said bladder;

end caps adjacent to the ends of said expandable mandrel, each end cap having a plurality of radial slots therethrough, and a bolt extending in slidable relationship through each slot and secured to said expandable mandrel, whereby as said expandable mandrel expands and contracts said bolts slide in said slots while preventing rotation of said expandable mandrel relative to said end caps;

at least one backup band wrapped around said expandable mandrel, said backup band covering less than all of the expandable mandrel surface;

a layer of thermal insulation material wrapped around the areas of said expandable mandrel not covered by said backup band, said insulation layer having a thickness greater than the thickness of said backup band; and means for moving said apparatus longitudinally within a tube.

8. The apparatus according to claim 7 wherein a single back-up band is wrapped around the center of the mandrel and two bands of said insulation material surround the mandrel along both edges of said back-up band.

9. The apparatus according to claim 7 further including a layer of thermal insulating material covering said bladder.

10. The apparatus according to claim 7 wherein said split expandable mandrel is split axially along at least two spaced lines producing pie-shaped portions and further includes spring means biasing said portions together.

11. The apparatus according to claim 7 wherein said means for moving said mandrel includes eyes secured to ends of said mandrel and means secured to said eyes and extending away from said mandrel for pulling said mandrel along said tube in either direction.

12. The apparatus according to claim 7 wherein said means for inflating said bladder includes a hose extending from said bladder through an end cap and adapted to be connected to a source of pressurized fluid.

* * * * *